(12) United States Patent
Lasak

(10) Patent No.: US 12,531,171 B2
(45) Date of Patent: Jan. 20, 2026

(54) STRAIN RELIEF MECHANISM FOR A MECHANICAL OR ELECTRICAL DEVICE

(71) Applicant: The ESAB Group, Inc., North Bethesda, MD (US)

(72) Inventor: Dawid Lasak, Stare Siołkowice (PL)

(73) Assignee: THE ESAB GROUP, INC., North Bethesda, MD (US)

(*) Notice: Subject to any disclaimer, the term of this patent is extended or adjusted under 35 U.S.C. 154(b) by 223 days.

(21) Appl. No.: 18/500,420

(22) Filed: Nov. 2, 2023

(65) Prior Publication Data

US 2025/0149208 A1 May 8, 2025

(51) Int. Cl.
*H01B 17/58* (2006.01)
*H01B 9/00* (2006.01)

(52) U.S. Cl.
CPC .......... *H01B 17/586* (2013.01); *H01B 9/001* (2013.01)

(58) Field of Classification Search
CPC .... H01B 17/586; H01B 9/001; H02G 15/007; H02G 3/06; B23K 9/32
USPC ........................................... 174/668
See application file for complete search history.

(56) References Cited

U.S. PATENT DOCUMENTS

| | | | |
|---|---|---|---|
| 5,874,709 A | 2/1999 | New et al. | |
| 6,472,631 B1 | 10/2002 | Eickhoff et al. | |
| 6,688,905 B2 | 2/2004 | Williams | |
| 6,852,943 B2 | 2/2005 | Eickhoff et al. | |
| 7,041,935 B2 | 5/2006 | Raymond et al. | |
| 7,176,404 B2 | 2/2007 | Herres | |
| 7,288,740 B2 | 10/2007 | Radtke | |
| 8,357,007 B2 | 1/2013 | Ihde et al. | |
| 8,772,668 B2 | 7/2014 | Leiteritz et al. | |
| 8,809,741 B2 | 8/2014 | Feldhausen et al. | |
| 8,895,895 B2 | 11/2014 | Feldhausen et al. | |
| 8,937,265 B2 | 1/2015 | Feldhausen et al. | |
| 8,937,266 B2 | 1/2015 | Feldhausen et al. | |
| 9,457,433 B2 | 10/2016 | Feldhausen et al. | |
| 9,821,413 B2 | 11/2017 | Feldhausen et al. | |
| 2005/0185368 A1 | 8/2005 | Radtke | |
| 2008/0203075 A1 | 8/2008 | Feldhausen et al. | |
| 2008/0283505 A1 | 11/2008 | Christopher et al. | |
| 2011/0189876 A1* | 8/2011 | Schneider | G02B 6/3888 439/271 |
| 2013/0043223 A1 | 2/2013 | Leiteritz et al. | |
| 2015/0034602 A1* | 2/2015 | Feldhausen | B23K 9/173 219/68 |
| 2018/0023340 A1* | 1/2018 | Goldberg | E06B 9/50 160/324 |
| 2021/0060689 A1 | 3/2021 | Bondy et al. | |

FOREIGN PATENT DOCUMENTS

| | | |
|---|---|---|
| AT | 406987 B | 11/2000 |
| WO | 2008106419 A2 | 9/2008 |
| WO | 2011126924 A1 | 10/2011 |
| WO | 2021064469 A2 | 8/2021 |

* cited by examiner

*Primary Examiner* — Timothy J Thompson
*Assistant Examiner* — Michael F Mcallister
(74) *Attorney, Agent, or Firm* — Edell, Shapiro & Finnan, LLC

(57) ABSTRACT

A strain relief mechanism that is used to prevent kinking or bending in an elongate member, such as a cable or a lead, that would otherwise damage or impair the cable or lead.

20 Claims, 17 Drawing Sheets

STRAIN RELIEF MECHANISM FOR A MECHANICAL OR ELECTRICAL DEVICE

FIELD OF THE INVENTION

The present invention relates to the field of strain relief mechanism and, in particular, to a strain relief mechanism that can be used with a mechanical or electrical device, such as a welding device.

BACKGROUND OF THE INVENTION

Conventional pieces of welding equipment, such as a wire feeder, are connected to one or more cables and/or leads in order to perform their functions. Some connected cables carry welding wire and/or process gas to and from the welding equipment. It is desirable to prevent a cable from being kinked or bent at angles to avoid damage to the welding wire within the cable or prevent the flow of process gas from being impeded. One of the locations at which a cable is at risk for kinking or bending is at the connection of the cable to the inlet or the outlet of a piece of welding equipment.

SUMMARY

The present application relates to a strain relief mechanism that is used to prevent kinking or bending in an elongate member, such as a cable or a lead, that would otherwise damage or impair the cable or lead.

In one implementation, a strain relief mechanism for a device that includes a housing with a wall having an opening therethrough, the device including an elongate member extending through the opening, the strain relief mechanism comprising a mounting plate having a backing plate and a first extension coupled to the mounting plate, a strain relief support having a base and a second extension coupled to the base, and a resilient member removably mounted between the first extension of the mounting plate and the second extension of the strain relief support, wherein the mounting plate and the strain relief support are coupled to each other, and the resilient member can be removed while the mounting plate and the strain relief support remain coupled.

In one embodiment, the wall has an inner surface and an outer surface, the mounting plate is positioned proximate to the inner surface, the strain relief support is positioned proximate to the outer surface, and the mounting plate and the strain relief support are coupled to the wall of the housing.

In one embodiment, each of the mounting plate and the strain relief support defines a hole, and the strain relief mechanism further comprises at least one fastener, wherein the at least one fastener extends through the hole of the mounting plate and the hole of the strain relief support.

In one embodiment, the wall of the housing is located between the mounting plate and the strain relief support, and the at least one fastener extends through a hole formed in the wall.

In another embodiment, the first extension extends inside of the second extension, and the first extension and the second extension define a channel into which the resilient member is inserted.

In another embodiment, the first extension has a first outer surface and a first inner surface, the second extension has a second outer surface and a second inner surface, and a channel is defined between the first extension and the second extension by the first outer surface and the second inner surface.

In one alternative embodiment, the resilient member is inserted into the channel between the first extension and the second extension.

Additionally, the first extension has a cylindrical configuration, each of the second inner surface and the second outer surface is conical, and the resilient member is a substantially cylindrical spring.

Alternatively, the first outer surface of the first extension has a wedge-shaped projection formed thereon, the wedge-shaped projection having a first end and a second end opposite the first end, the first end having a first width, the second end having a second width, and the second width being greater than the first width.

In another embodiment, the resilient member is rotated about the first extension to engage the wedge-shaped projection, and the resilient member engages the first end of the wedge-shaped projection as it is rotated.

Additionally, the base includes a stop formed thereon, and the resilient member engages the stop after it has rotated past the wedge-shaped projection.

In one embodiment, the resilient member has a first portion with coils at a first spacing and a second portion with coils at a second spacing, the second spacing being smaller than the first spacing, the first portion is located between the mounting plate and the strain relief support, and the second portion is spaced apart from the mounting plate and the strain relief support.

In another implementation, a strain relief mechanism for a welding device, the welding device including a housing with a wall having an opening therethrough, the welding device including one of a lead or a cable extending through the opening, the strain relief mechanism comprises a mounting plate having a first base and a first extension coupled to the first base, a support having a second base and a second extension coupled to the second base, and a resilient member removably coupled to and located between the first extension and the second extension, wherein the mounting plate and the support are coupled to each other and located on opposite sides of the wall, the one of a lead or a cable is insertable through the mounting plate, the support, and the resilient member, and the resilient member is removable while the mounting plate and the support are coupled.

In one embodiment, the wall has an inner surface and an outer surface, the mounting plate is positioned proximate to the inner surface, the support is positioned proximate to the outer surface, and the resilient member is located outside of the housing.

In another embodiment, the first extension has a first outer surface and a first inner surface, the second extension has a second outer surface and a second inner surface, a channel is defined between the first outer surface of the first extension and the second inner surface of the second extension, and the resilient member is insertable into the channel.

In an alternative embodiment, each of the first outer surface and the first inner surface is cylindrical, and each of the second inner surface and the second outer surface is conical.

In yet another alternative embodiment, the first outer surface has a wedge-shaped projection formed thereon, the wedge-shaped projection having a varying width, the resilient member is rotated about the first extension to engage the wedge-shaped projection, and the resilient member engages the wedge-shaped projection as it is inserted into the channel and rotated.

In another implementation, a device comprises a housing with a wall having an opening therethrough, an elongate member extending through the opening, and a strain relief mechanism includes a mounting plate having a first base and a first extension coupled to the first base, a support member having a second base and a second extension coupled to the second base, and a resilient member removably mounted between the first extension of the mounting plate and the second extension of the support member, wherein the first extension of the mounting plate extends through the opening in the wall, the elongate member extends through the first extension, the second extension, and the resilient member, and the resilient member can be removed while the mounting plate and the support member remain coupled to the wall.

In one embodiment, the wall has an inner surface and an outer surface, the mounting plate is positioned proximate to the inner surface, the support member is positioned proximate to the outer surface, and the mounting plate is coupled to the support member with the wall of the housing located therebetween.

In another embodiment, the first extension has an outer surface with a wedge-shaped projection formed thereon, the wedge-shaped projection having a varying width from a first end and to an opposite second end, and the resilient member is rotated about the first extension to engage the wedge-shaped projection, and the resilient member engages the first end of the wedge-shaped projection as it is rotated.

BRIEF DESCRIPTION OF THE DRAWINGS

The various apparatuses, systems, devices, and/or components presented herein may be better understood with reference to the following drawings and description. It should be understood that some elements in the figures may not necessarily be to scale and that emphasis has been placed upon illustrating the principles disclosed herein. In the figures, like-referenced numerals designate corresponding parts throughout the different views.

DETAILED DESCRIPTION

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

The present invention relates to a strain relief mechanism that is used to prevent kinking or bending in an elongate member, such as a cable or a lead, that would otherwise damage or impair the cable or lead. The strain relief mechanism can be used with a device, such as a mechanical and/or electrical device that includes one or more cables or leads.

The strain relief mechanism may be coupled to a device or equipment at the inlet or outlet such that the strain relief mechanism extends outwardly from a sidewall of the device or equipment. When the strain relief mechanism is fully installed on a device, a cable may be inserted through the center of the resilient member of the strain relief mechanism to connect the cable with an inlet or outlet of the welding equipment.

The strain relief mechanisms disclosed herein can be used with a welding device or welding equipment. In different embodiments, the welding device may have a different configuration or shape. While in one embodiment, the welding device is a wire feeder, in other embodiments, the welding device can have other features or characteristics.

Figure 1:
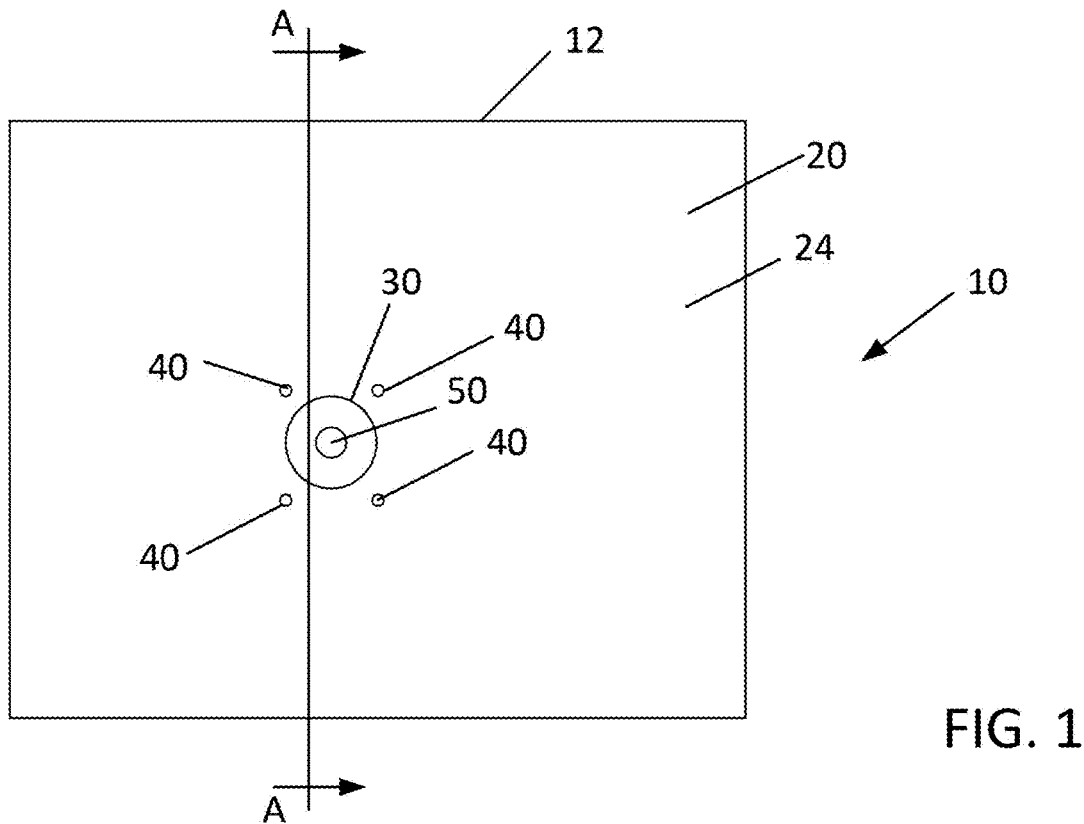
FIG. 1 is a schematic side view of an exemplary embodiment of a device.
Figure 2:
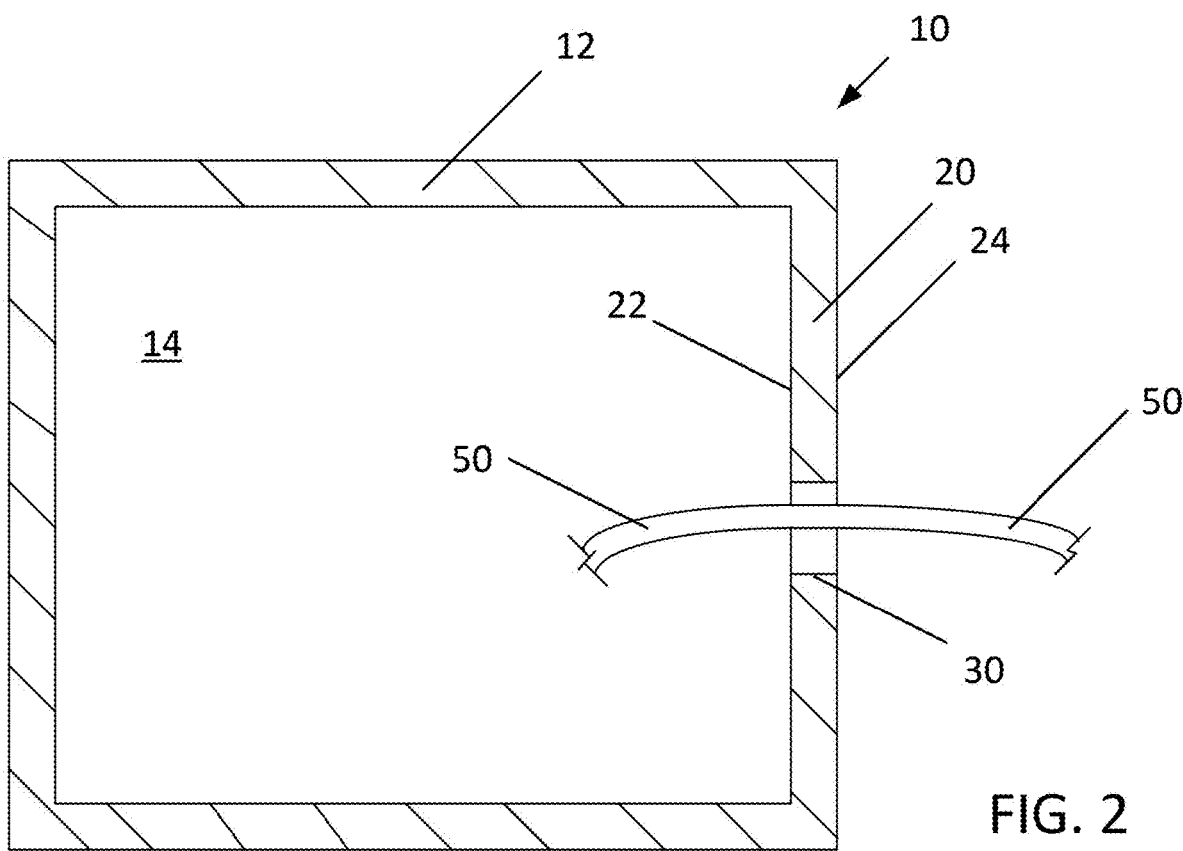
FIG. 2 is a cross-sectional schematic side view of the device illustrated in FIG. 1 taken along the line "A-A" in FIG. 1.
Figure 3:
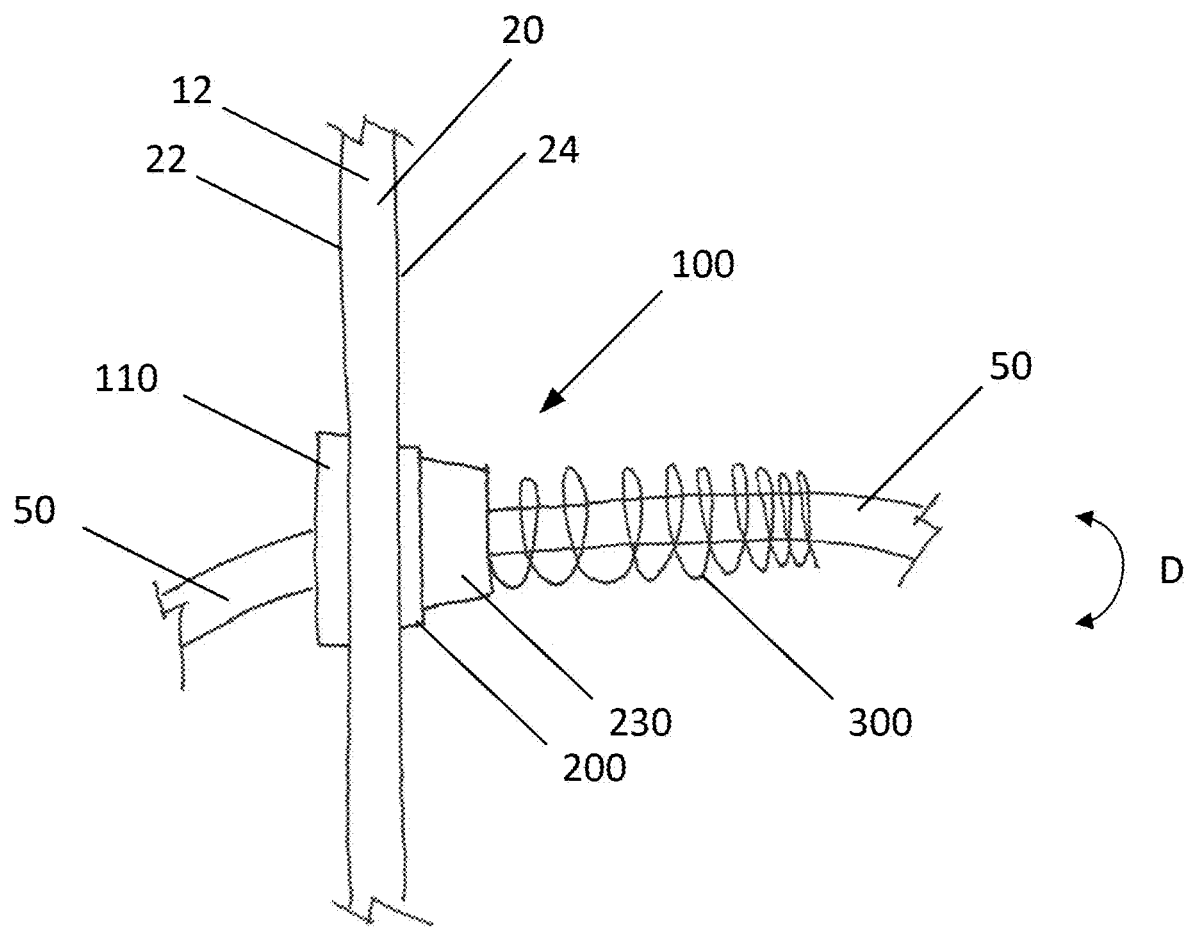
FIG. 3 is a close-up side view of a portion of the device illustrated in FIG. 1 with a strain relief mechanism.

Turning to FIGS. 1-3, various views of an exemplary embodiment of a device are illustrated. Initially, FIG. 1 is a schematic side view of an embodiment of a device 10, which in one embodiment can be welding equipment, such as a wire feeder. Device 10 includes a housing 12 that has several walls, including wall 20, which can be referred to alternatively as a sidewall. Wall 20 has an outer surface 24 and several openings formed therein. Opening 30 is an inlet or an outlet opening or hole through which an elongate member 50, such as a cable or lead, can pass. In one embodiment, the cable or lead 50 can include a welding wire or a process gas passing therethrough. Surrounding the opening 30 are several mounting openings 40 through which fasteners (not shown in FIG. 1) can be inserted.

Turning to FIG. 2, a cross-sectional schematic side view of the device illustrated in FIG. 1 taken along the line "A-A" in FIG. 1 is shown. In this embodiment, the housing 12 of the device 10 has several walls, including wall 20, that define an interior region or chamber 14. Any number of mechanical or electrical components can be located in the interior region 14. Wall 20 has an inner surface 22, which is opposite to its outer surface 24 illustrated in FIG. 1. Opening 30 is shown in wall 20, and the cable 50 extends through the opening 30. In different embodiments, the size and shape of the opening 30 can vary, provided that the opening 30 is sized sufficiently to allow the cable 50 to extend therethrough.

Referring to FIG. 3, a close-up side view of a portion of the device illustrated in FIG. 1 with a strain relief mechanism is illustrated. A portion of wall 20 of housing 12 is illustrated with its inner surface 22 and its outer surface 24. The cable 50 extending through the wall 20 is shown as well.

In FIG. 3, an embodiment of a strain relief mechanism is illustrated. Strain relief mechanism 100 is shown coupled to the housing 12. In this embodiment, the strain relief mechanism 100 includes a mounting plate 110, a support 200, and a resilient member 300. Mounting plate 110 is located on the inside of the housing 12 and proximate to inner surface 22 of wall 20. Support 200 is located on the outside of the housing 12 and proximate to outer surface 24 of call 20. The support 200 may be referred to alternatively as a support member or a strain relief support.

Support 200 includes an extension 230 from which resilient member 300 extends. The extension 230 can be referred to alternatively as an outer portion. The cable 50 extends through the mounting plate 110, the support 200, and the resilient member 300, as shown. The resilient member 300 has sufficient stiffness to prevent the cable 50 from kinking or bending too far, which would damage the contents of the cable 50 or impair the flow, such as a flow of process air, through the cable 50. The stiffness of the resilient member 300 reduces the range of movement of cable 50 along the arrows of line "D" in FIG. 3.

Figure 4:
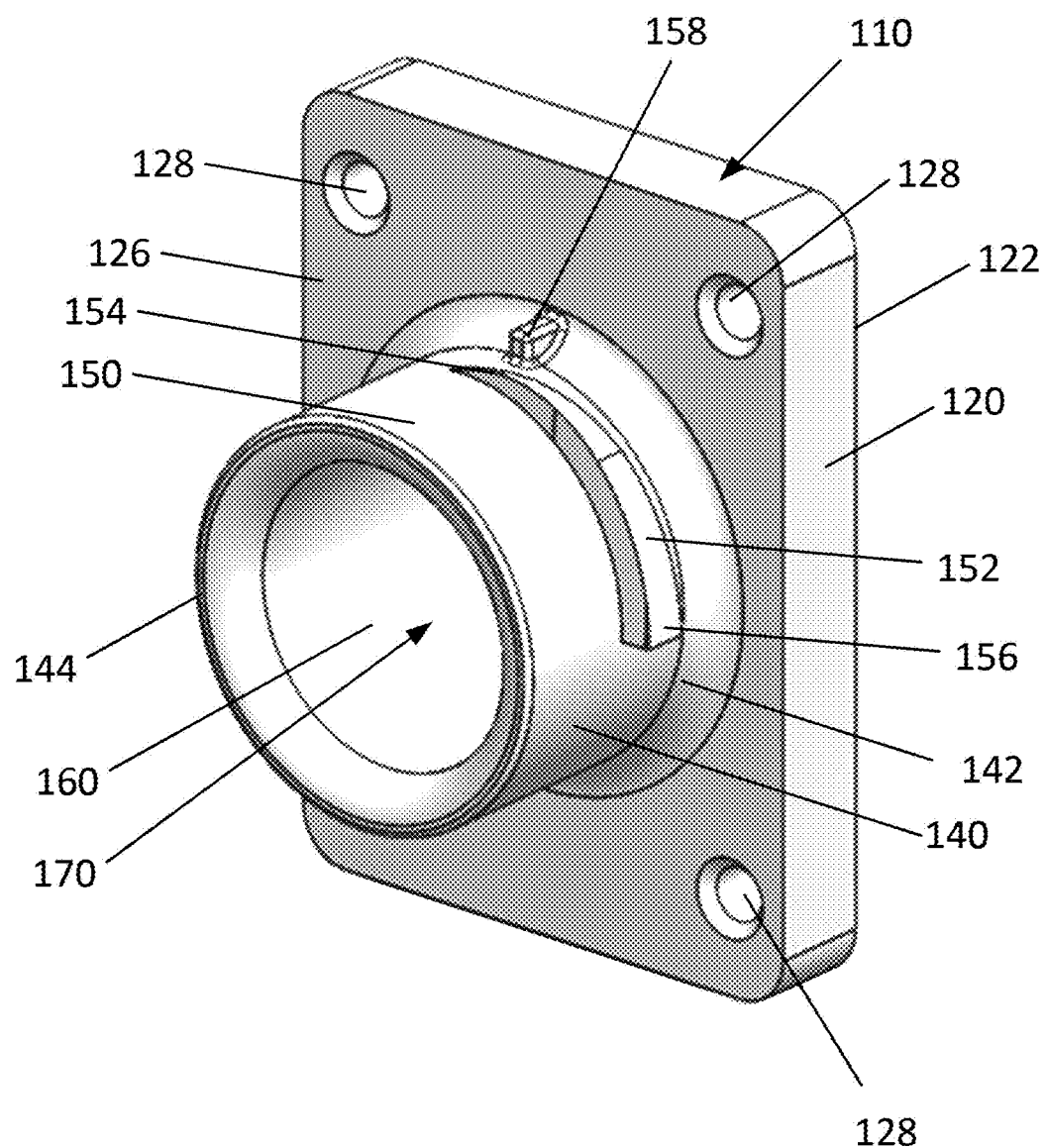
FIG. 4 is a perspective view of an embodiment of a mounting plate of the strain relief mechanism illustrated in FIG. 3.

Turning to FIGS. 4-7, various views are shown of an exemplary embodiment of a mounting device of a strain relief mechanism, such as strain relief mechanism 100 in FIG. 3. Initially, FIG. 4 is a perspective view of mounting plate 110. Mounting plate 110 includes a plate or base 120, which can be referred to alternatively as a backing plate or panel. The base 120 has an inner surface 122, which is oriented inwardly relative to the housing 12, when the mounting plate 110 is coupled to the housing 12. The base 120 also includes an outer surface 126 that is opposite to inner surface 122. The base 120 includes several mounting holes 128 spaced around the base 120. The mounting holes 128 are threaded. In this embodiment, the base 120 has four mounting holes 128, although only three mounting holes 128 are illustrated in FIG. 4.

The mounting plate 110 includes an extension 140 that extends away from the base 120. Extension 140 includes a proximal end 142 and a distal end 144 opposite the proximal end 142. The proximal end 142 is coupled to the base 120. While in this embodiment, the extension 140 is integrally formed with base 120, in other embodiments, the extension 140 can be formed separately from the base 120 and subsequently coupled thereto using any known technique or mechanism. When the mounting plate 110 is located against the interior surface of a sidewall of the device or equipment, the extension 140 protrudes outwardly from the device or equipment through either the inlet or the outlet.

The extension 140 has an outer surface 150 and an inner surface 160 opposite to the outer surface 150. In this embodiment, each of the outer surface 150 and the inner surface 160 is cylindrical. The inner surface 160 defines a conduit 170 through the extension 140. The outer surface 150 of the extension 140 has a wedge-shaped projection 152 extending outwardly therefrom. The wedge-shaped projection 152 extends at least partially around the extension 140. The wedge-shaped projection 152 has opposite ends 154 and 156, with end 154 having a width and terminating in a point and end 156 having a different width. The width of end 156 is larger than the width of end 154. Proximate to proximal end 142 of extension 140 is a projection that functions as a stop 158.

Figure 5:
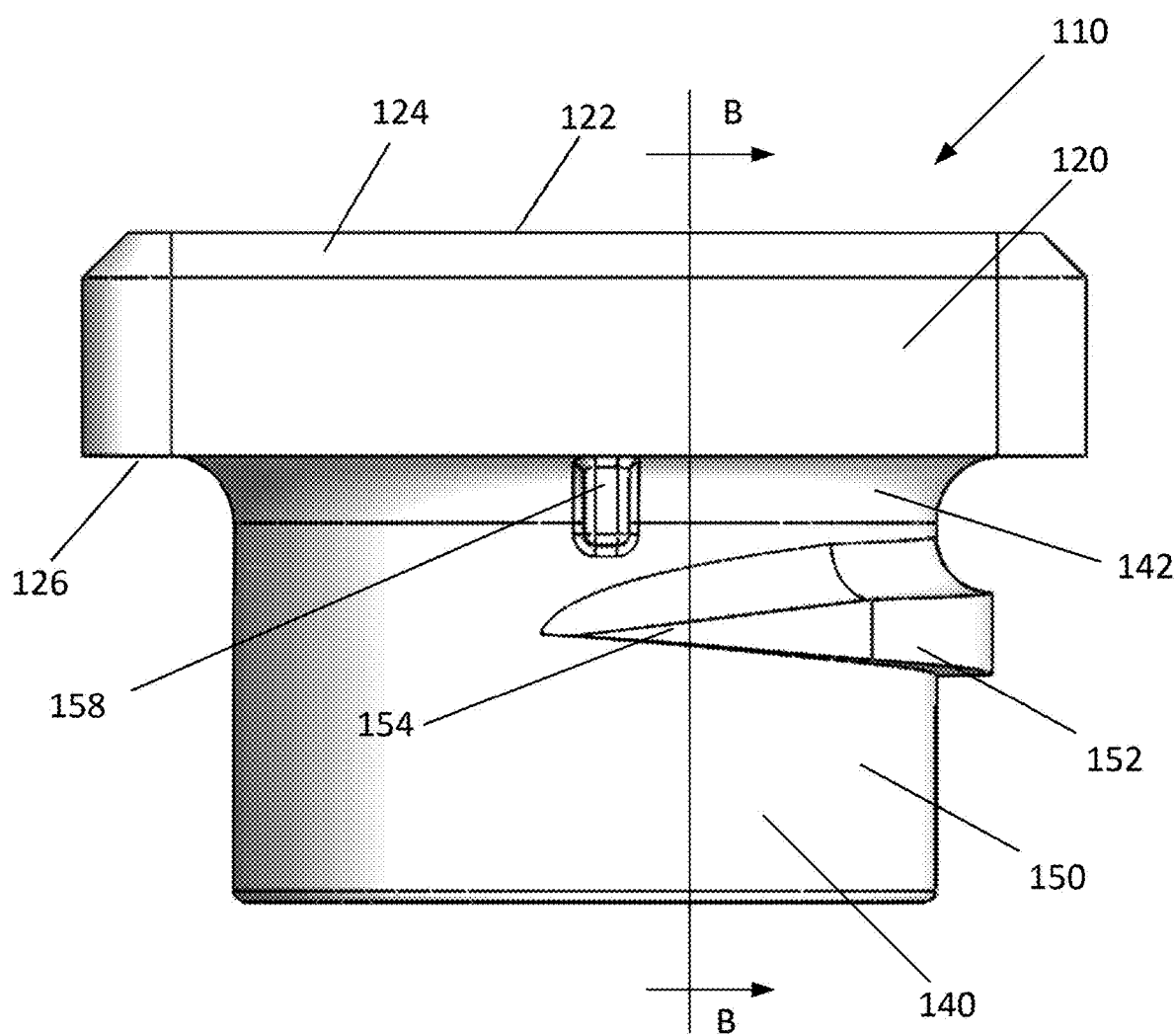
FIG. 5 is a top view of the mounting plate illustrated in FIG. 4.

Turning to FIG. 5, several features of the mounting plate 110 shown in and described relative to FIG. 4 are illustrated. In addition to inner surface 122 and outer surface 126, in this embodiment, the base 120 includes a beveled surface 124 proximate to the inner surface 122. As for the extension 140, the wedge-shaped projection 152 on the outer surface 150 is shown. The tapered or narrowed end 154 of the wedge-shaped projection 152 can be seen in this view. The wedge-shaped projection 152 increases in size after the helix. In one embodiment, the wedge-shaped projection 152 has the same pitch as the pitch of the coils of the resilient member 300 that engage the wedge-shaped projection 152, as described below. Also shown is the relative position of the stop 158 and its location relative to proximate end 142.

Figure 6:
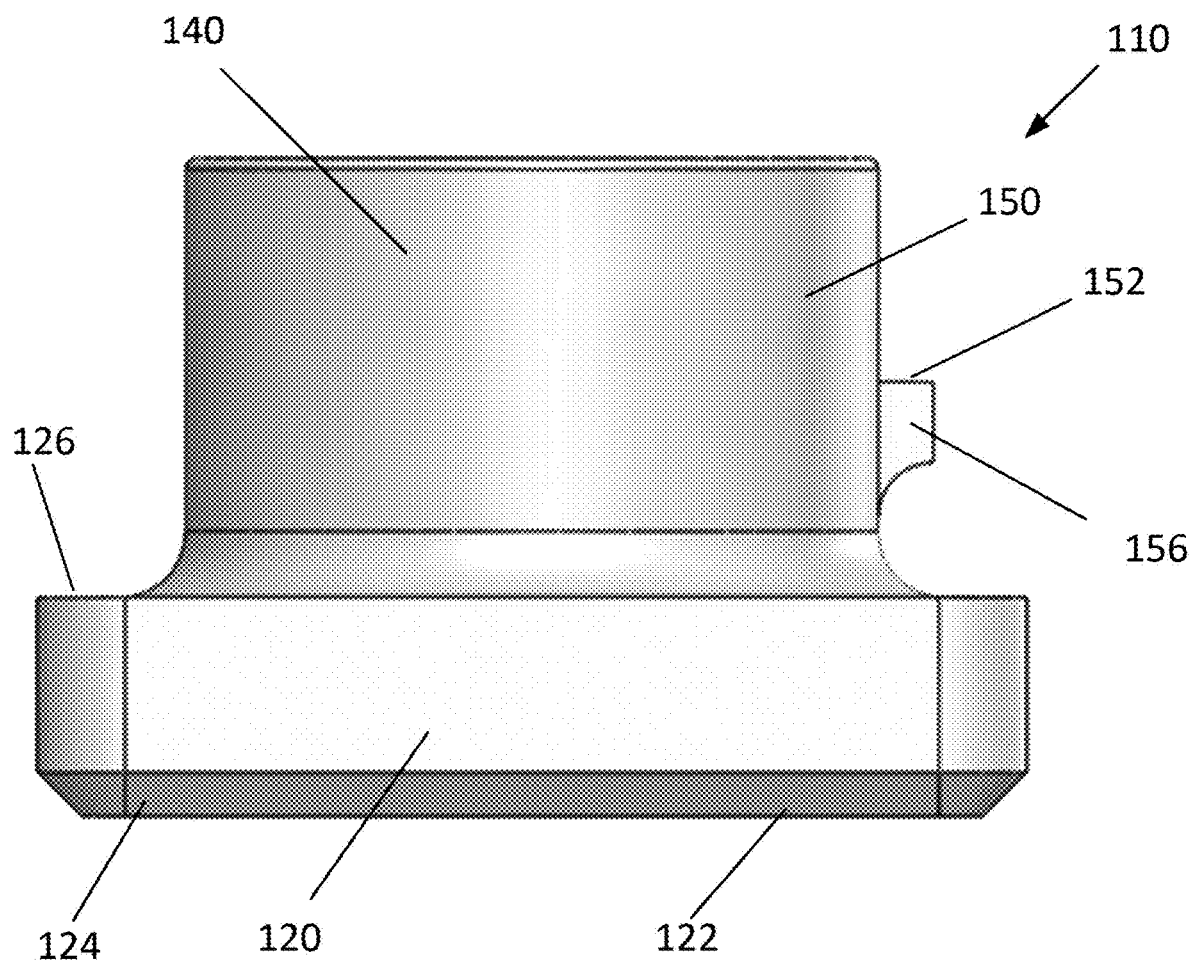
FIG. 6 is a side view of the mounting plate illustrated in FIG. 4.

Similarly, in FIG. 6, a different view of the various surfaces 122, 124, and 126 of the base 120 of mounting plate 110 is illustrated. In this view, the larger or wider end 156 of the wedge-shaped projection 152 on outer surface 150 of the extension 140 is shown. The functions of the wedge-shaped projection 152 and the stop 158 are described in detail below.

Figure 7:
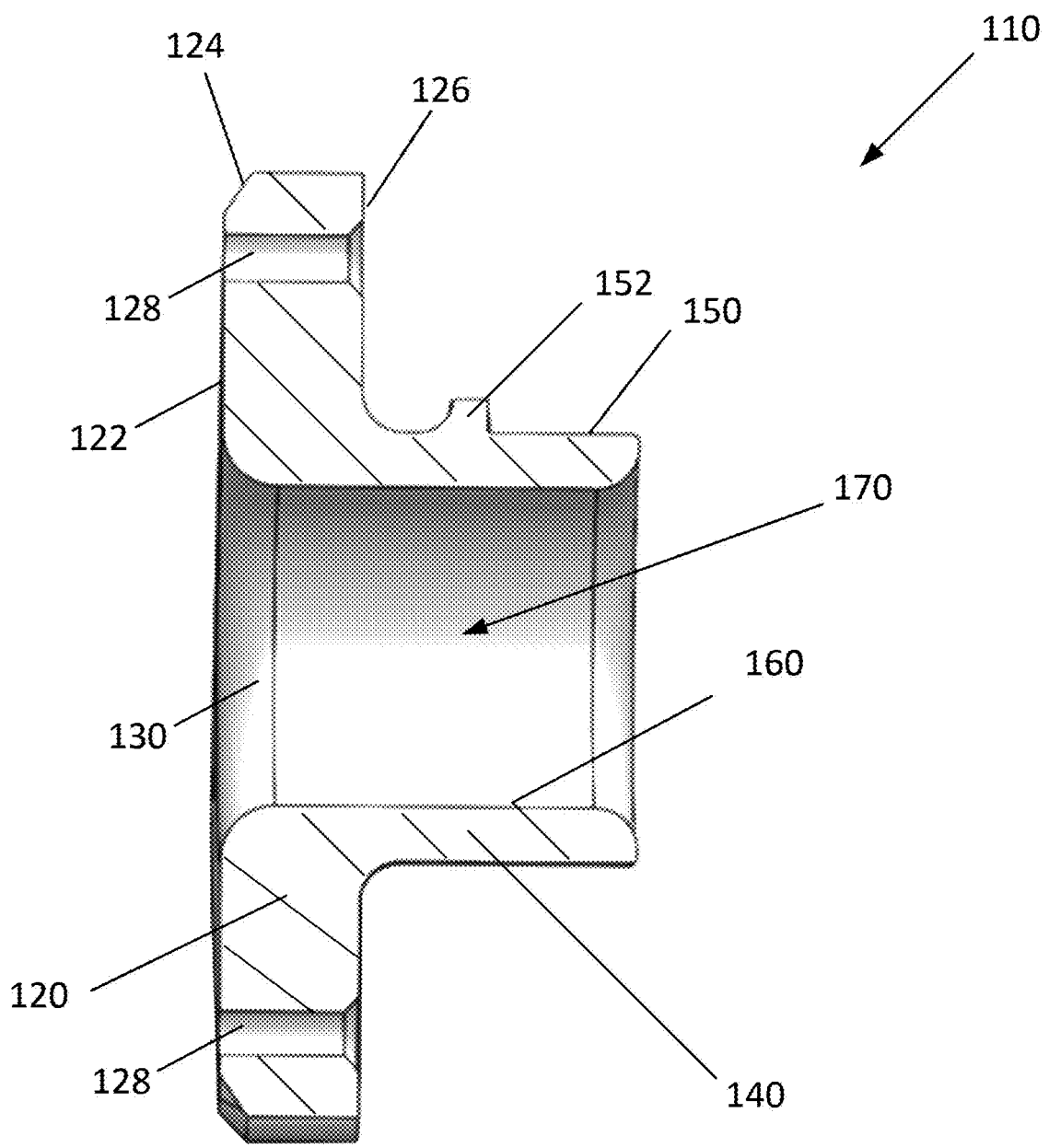
FIG. 7 is a cross-sectional side view of the mounting plate illustrated in FIG. 4 taken along the line "B-B" in FIG. 5.

Referring to FIG. 7, a cross-sectional side view of the mounting plate 110 taken along the line "B-B" in FIG. 5 is illustrated. Once again, the various surfaces 122, 124, and 126 of the base 120 are shown. As mentioned above, the base 120 also includes several holes 128 through which fasteners can be inserted to couple the mounting plate 110 to the wall 20 of the housing 12 and to the support 200. Base 120 also includes opening 130 through which a cable 50 can be inserted. The opening 130 in base 120 is aligned and in fluidic communication with conduit 170, which is defined by the inner surface 160 of extension 140. The relative position of wedge-shaped projection 152 on the outer surface 150 is also shown.

Figure 8:
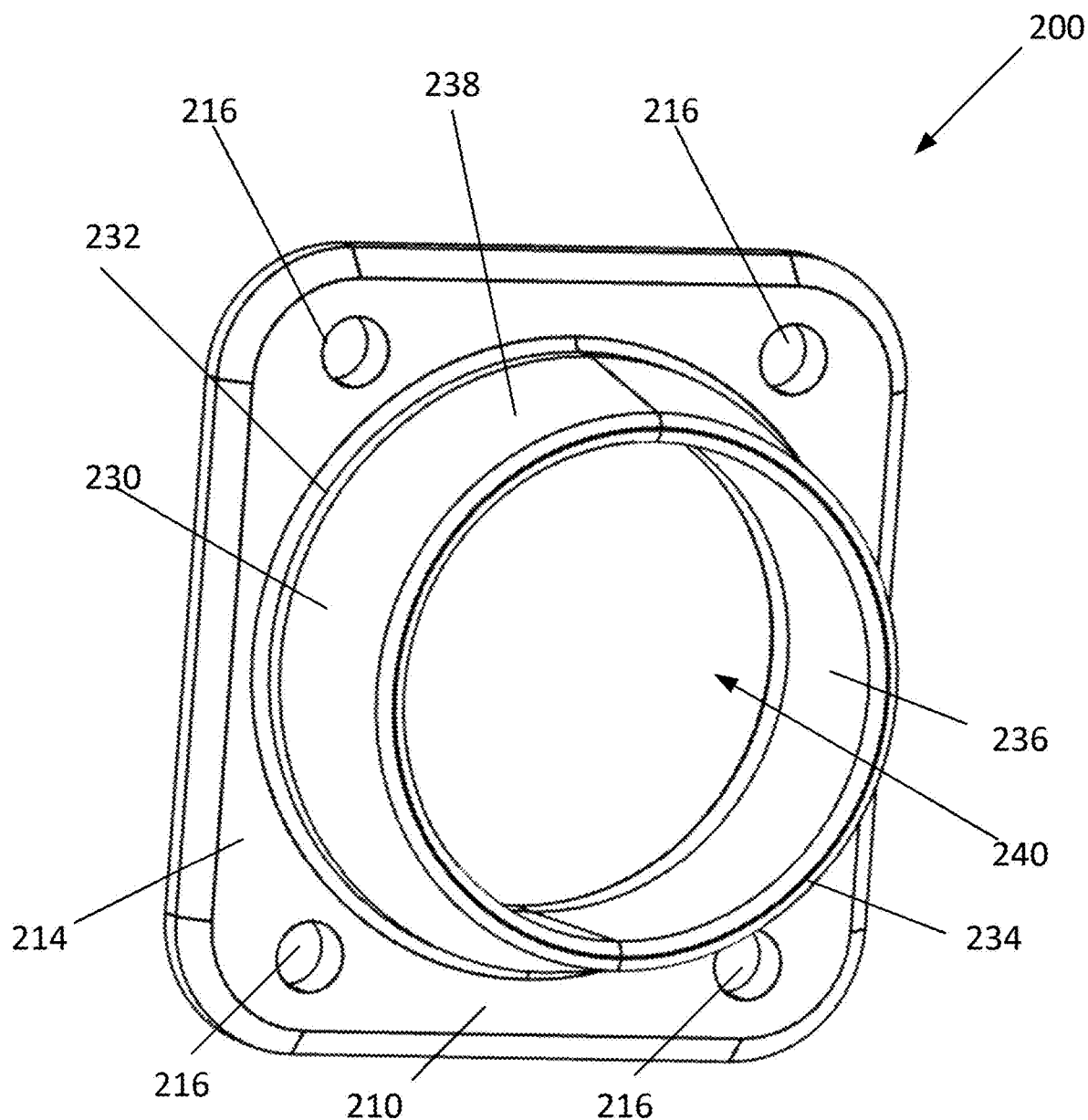
FIG. 8 is a perspective view of an embodiment of a support member of the strain relief mechanism illustrated in FIG. 3.
Figures 9, 10:
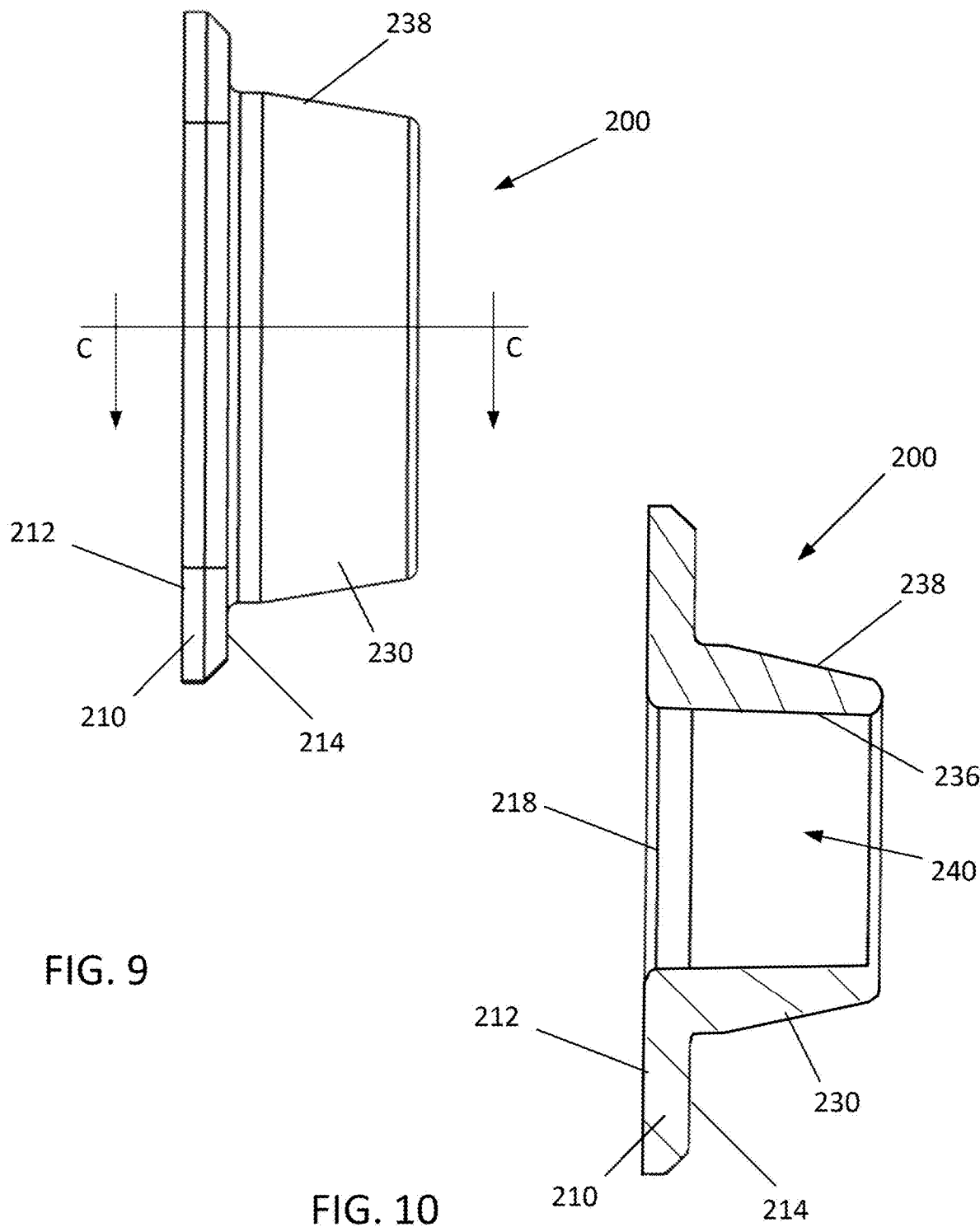
FIG. 9 is a side view of the support member illustrated in FIG. 8.
FIG. 10 is a cross-sectional side view of the support member illustrated in FIG. 8 taken along line "C-C" in FIG. 9.

Referring to FIGS. 8-10, different views of an embodiment of support 200 are illustrated. Initially turning to FIG. 8, a perspective view of support 200 is shown. In this embodiment, support 200 includes a base 210 and an extension 230 coupled to the base 210. The extension 230 can be referred to alternatively as an outer cone portion. While in this embodiment, the extension 230 is integrally formed with base 210, in other embodiments, the extension 230 can be formed separately from the base 210 and subsequently coupled thereto using any known technique or mechanism.

The base 210 has an outer surface 214 that has several holes 216 through which fasteners may be inserted. The extension 230 has a proximal or inner end 232 next to the outer surface 214 of the base 210, and a distal or outer end 234 opposite to proximal end 232. The extension 230 has an inner surface 236 and an outer surface 238 opposite thereto. The inner surface 236 defines a conduit 240 that extends through the extension 230. Conduit 240 can be referred to alternatively as a passageway.

Turning to FIG. 9, a side view of the base 210 and the extension 230 of support 200 is illustrated. FIG. 10 is a cross-sectional side view of the support 200 taken along line "C-C" in FIG. 9. The inner surface 212 and the outer surface 214 of the base 210 are shown along with an opening 218 that is formed in the base 210. The opening 218 is sized sufficiently to allow a cable 50 to be inserted therethrough. In this embodiment, the inner surface 236 of the extension 230 is conical and the outer surface 238 is conical. As mentioned above, the inner surface 236 defines the conduit 240 through which the cable 50 extends.

Figure 11:
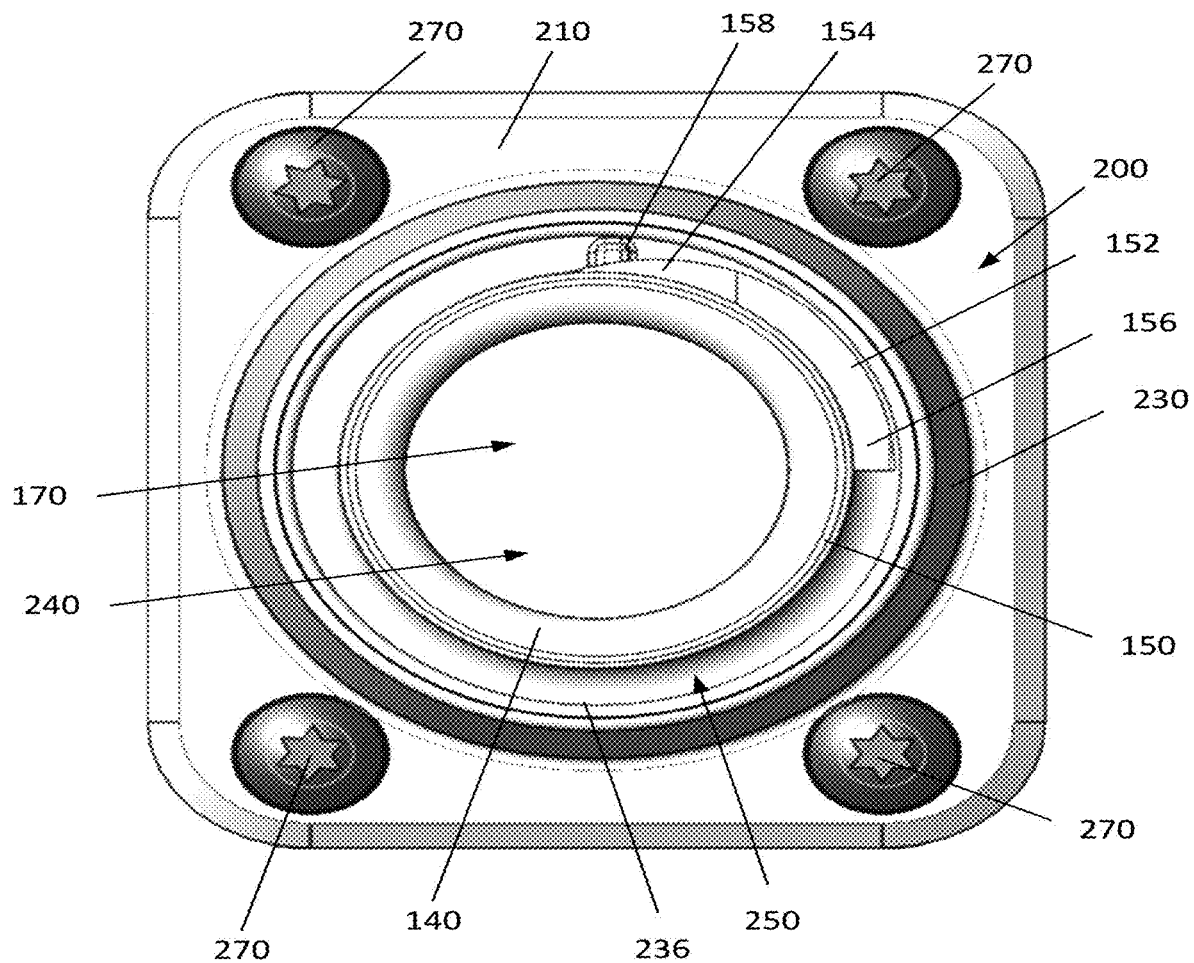
FIG. 11 is a front view of the strain relief mechanism illustrated in FIG. 3 with the device, the cable, and the resilient member not illustrated.

Referring to FIG. 11, a front view of the coupled mounting plate 110 and support 200 is illustrated. In this view, which is from outside the welding device, the support 200 is best seen, with mounting plate 110 behind the support 200. When the mounting plate 110 is placed against the interior surface of the sidewall of the device such that extension 140 protrudes through the inlet or outlet of the device, the support 200 may be placed against the outer surface of the sidewall of the device and secured to both the sidewall of the device and the mounting plate 110 via fasteners 270, such as screws or bolts. As a result, the sidewall of the device is sandwiched between the support 200 and the mounting plate 110.

Thus, the mounting plate 110 and support 200 are coupled together in FIG. 11, with the housing 12, which is captured between the mounting plate 110 and the support 200, not illustrated, and also the resilient member 300 not illustrated. It is to be understood that the mounting plate 110 and the support 200 are coupled together with the wall 20 therebetween, even though the wall 20 is not illustrated in FIG. 11, or in either FIG. 12 or FIG. 13 described below. The support 200 and the mounting plate 110 may be more permanently affixed to the sidewall of the device, while the resilient member 300 may be easily removed and installed when desired.

Several fasteners 270 are inserted into holes 216 in base 210 and holes 128 in base 120. The fasteners 270 can be secured with securing mechanisms, such as nuts (not shown). In FIG. 11, the view is taken looking into conduit 170 defined by extension 140 and conduit 240 defined by extension 230. The inner diameter defined by inner surface 236 is larger than the outer diameter defined by outer surface 150 for multiple reasons. One reason is that the larger diameter of 236 enables the extension 140 of the mounting plate 110 to be inserted into conduit 240 of the support 200. Another reason is that a channel 250 is formed between the inner surface 236 and the outer surface 150. The channel 250 is sized to receive an end of the resilient member 300, as described in more detail below relative to FIGS. 12 and 13, as the resilient member 300 is inserted between the mounting plate 110 and the support 200 to mount the resilient member 300. The channel 250 is also sized to accommodate both the wedge-shaped projection 152 on extension 140 and the stop 158.

As the resilient member 300 is inserted into channel 250, the inserted end of the resilient member 300 engages end 154 of the wedge-shaped projection 152. The resilient member 300 is positioned so that the innermost coil can be located below the end 154, which results in the end 154 being located between coils of the resilient member 300. A user can then screw the resilient member 300 onto the extension 140 such that sections of the resilient member 300 engage with the wedge-shaped projection 152 as the resilient member 300 is rotated clockwise about its longitudinal axis. The rotation of resilient member 300 results in the end 154 of the wedge-shaped projection 152 advancing between coils of the resilient member 300. The resilient member 300 can be rotated until its innermost edge engages the stop 158. The engagement of the coils of the resilient member 300 with the wedge-shaped projection secures the resilient member to the mounting plate 110 and the support 200. In order to remove the resilient member 300, the user may unscrew the resilient member 300 by rotating it in a counterclockwise direction until the coils of the resilient member 300 are no longer engaged with the wedge-shaped projection 152. At that point, the resilient member 300 may be pulled from between the support 200 and the extension 140 of the mounting plate 110 to remove the resilient member 300 from the support 200 and the mounting plate 110, and as a result, from the device.

Figure 12:
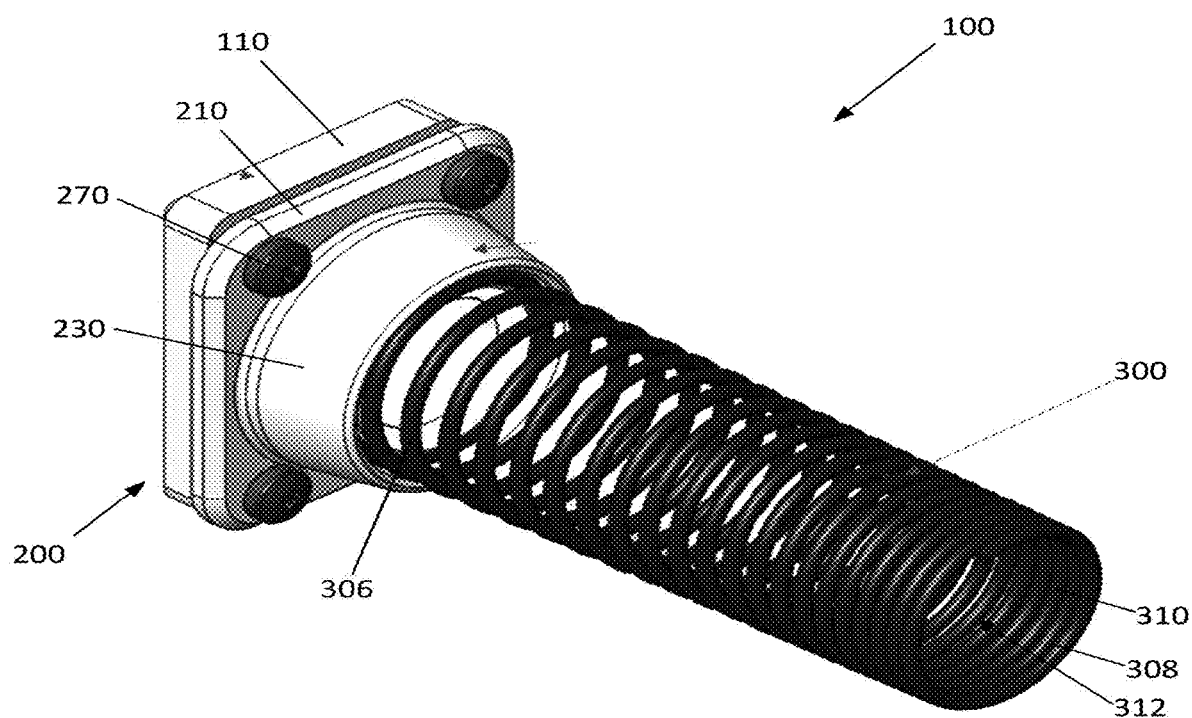
FIG. 12 is a perspective view of the strain relief mechanism illustrated in FIG. 3.
Figure 13:
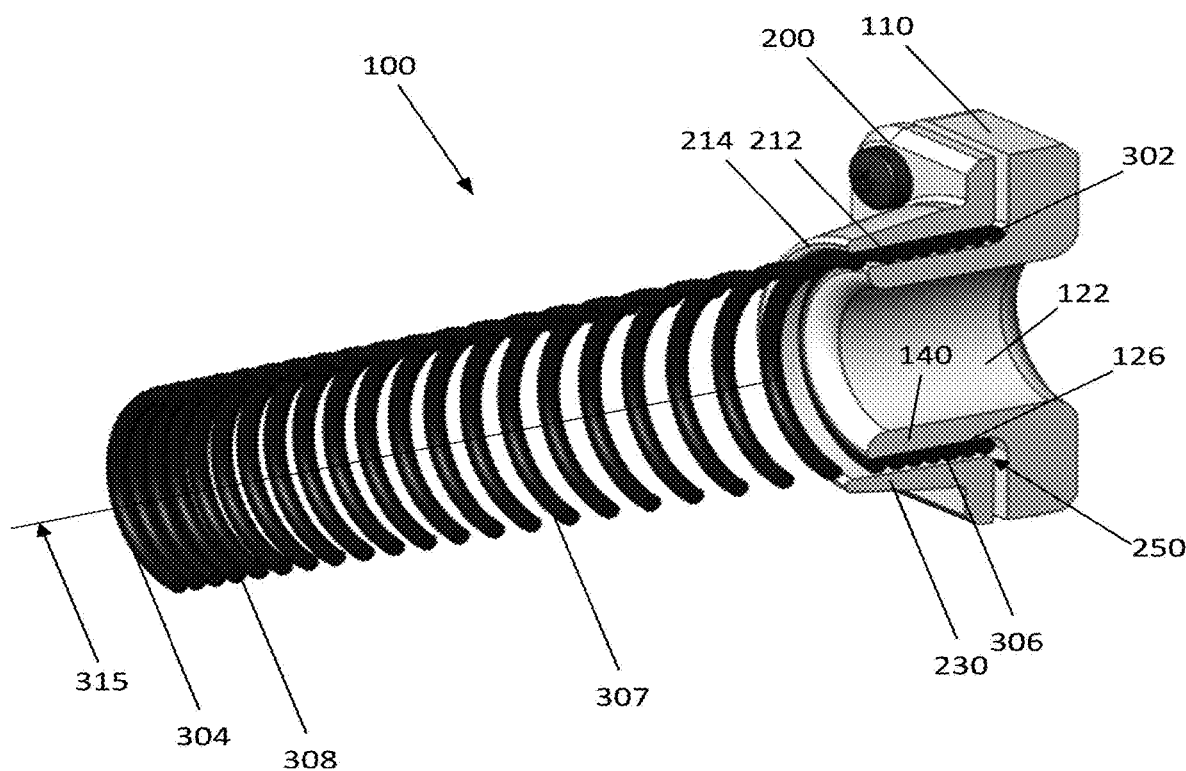
FIG. 13 is a cross-sectional perspective view of the strain relief mechanism illustrated in FIG. 12.

Turning to FIGS. 12 and 13, perspective views of the mounting plate 110, the support 200, and the resilient member 300 of the strain relief mechanism 100 are illustrated. Turning initially to FIG. 12, the mounting plate 110 is shown coupled to the base 210 of support 200 by fasteners 270. The extension 230 coupled to base 210 is illustrated, with the resilient member 300 extending therefrom. In this embodiment, the resilient member 300 is a coiled spring that has a proximal portion 306 next to the support 200 and an opposite distal portion 308 that is located away from the support 200. The resilient member 300 includes several coils, which collectively have an inner surface 310 that defines a passageway 312 through the resilient member 300. Passageway 312 is sized sufficiently so that cable 50 can be inserted therethrough.

Referring now to FIG. 13, a cross-sectional perspective view of strain relief mechanism 100 is shown. Mounting plate 110 and support 200 are coupled together, which results in channel 250 be formed therebetween. As previously mentioned, the inner surface 122 and the outer surface 126 of extension 140 are cylindrical, the inner surface 236 of extension 230 is conical, and the outer surface 238 of extension 230 is conical.

The resilient member 300 has been inserted into channel 250 and rotated into the innermost position illustrated in FIG. 13. In this position, end 302 is next to the interface between the support 200 and the mounting plate 110. The proximal portion 306 of the resilient member 300 is located between extension 140 and extension 230. The resilient member 300 has a middle portion 307 that has coils that are spaced apart by distances that are greater than the spacing between the coils located in the distal portion 308 and out to the distal end 304 of the resilient member 300. The longitudinal axis 315 about which the resilient member 300 can be rotated is illustrated.

In different embodiments, the inner diameter of the coils of the resilient member 300 can vary along its length. For example, the inner diameter of the coils closer to proximal portion 306 can be larger than the inner diameter of the coils closer to the distal portion 308.

Referring to FIGS. 14-19, various views of an example embodiment of welding equipment with a strain relief mechanism are illustrated. The welding equipment illustrated in FIGS. 14-19 is exemplary only, and in different embodiments, may have different features or functionalities. The welding equipment 400 has a housing 402 that has several portions removed so that part of the interior region 404 can be viewed. The welding equipment 400 includes several components 406 located in the interior region 404. In one example, the welding equipment 400 can be a wire feeder to which a cable 450 is coupled. The cable 450 has an inner passageway through which a wire travels to a distal end of the cable 450.

Figure 14:
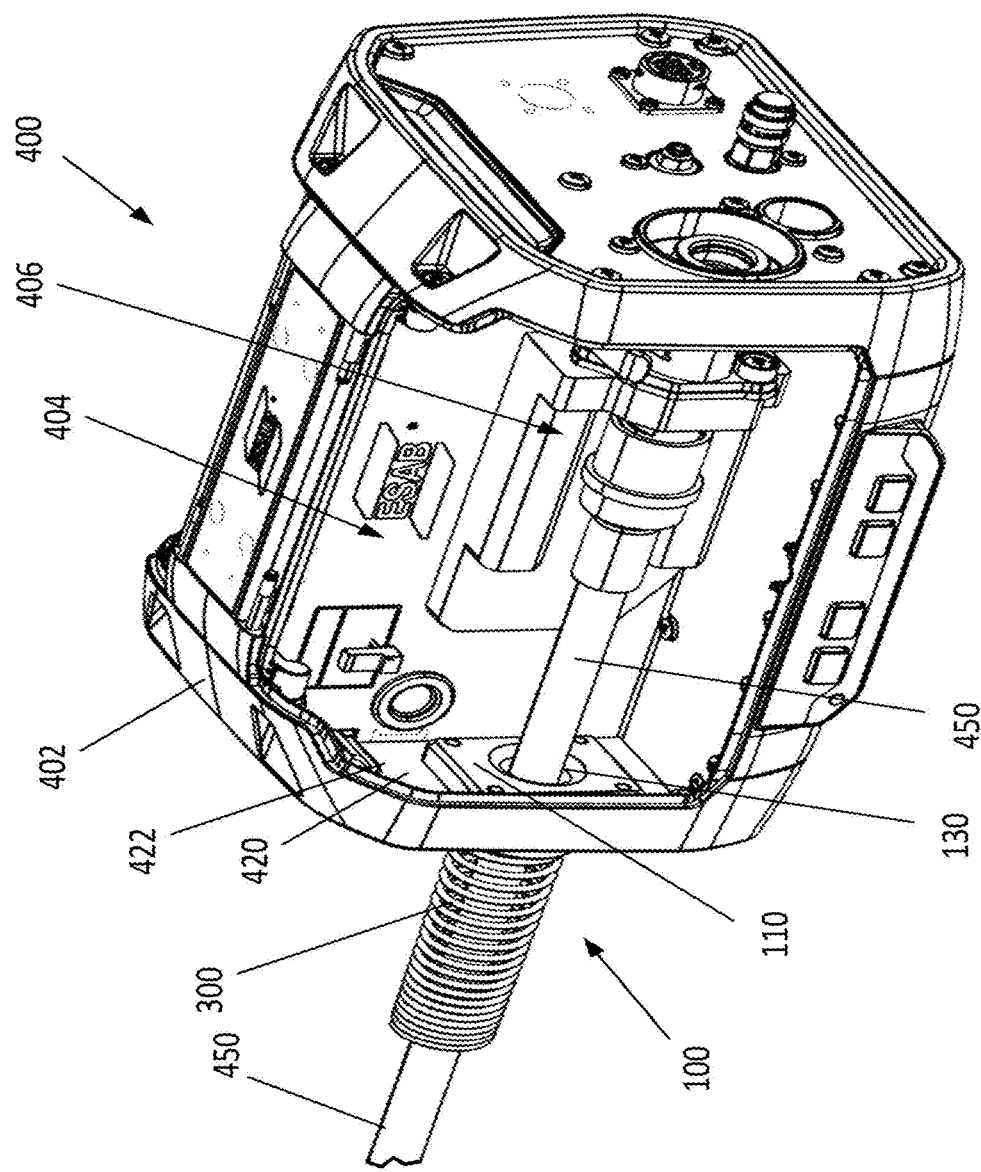
FIG. 14 is a perspective view of an example embodiment of welding equipment, with some portions of its housing removed, showing the strain relief mechanism.
Figure 15:
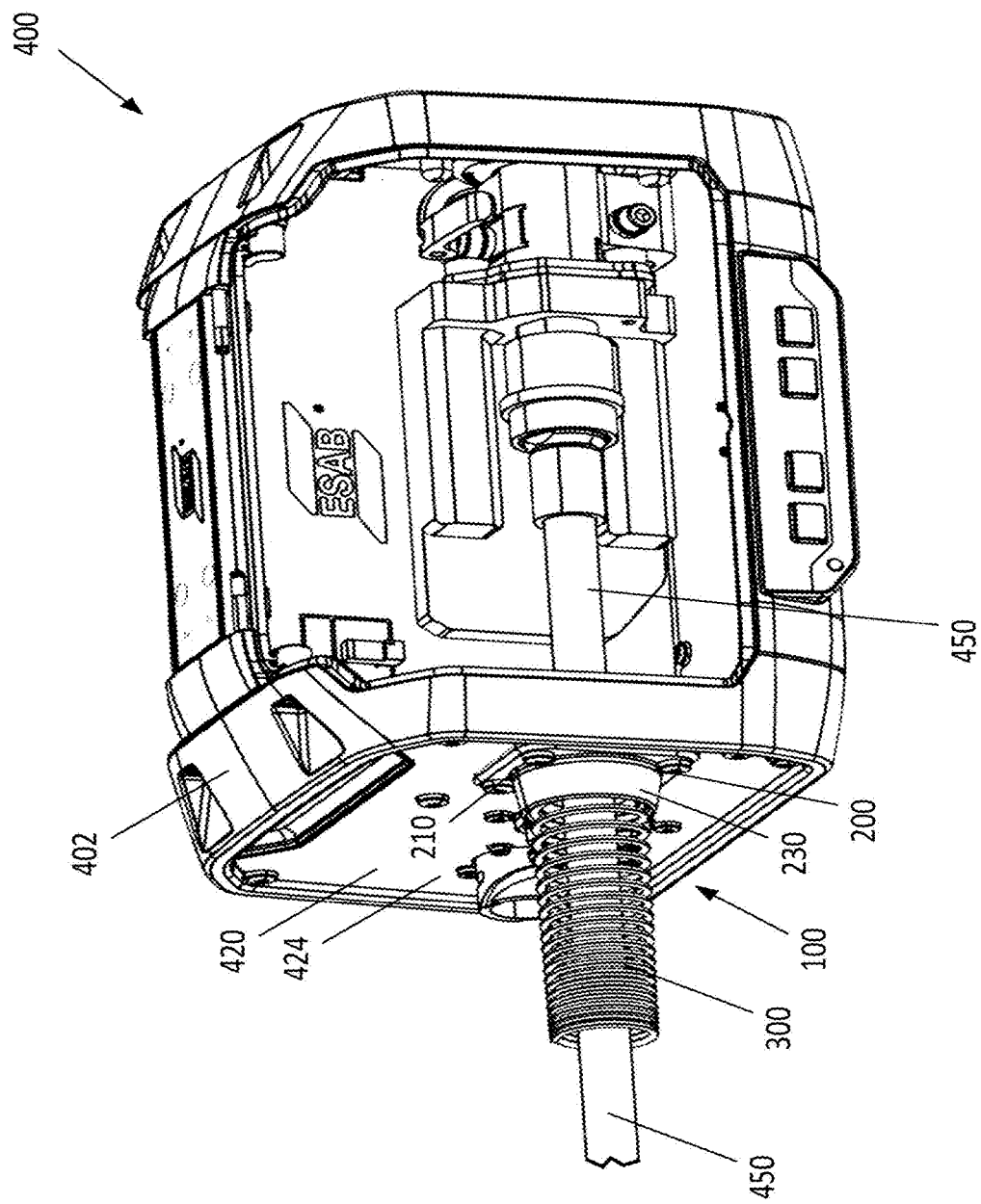
FIG. 15 is a side perspective view of the welding equipment illustrated in FIG. 14.

Referring to FIGS. 14 and 15, perspective views of the welding equipment 400 are illustrated. The welding equipment 400 includes a strain relief mechanism 100, having components similar to those described above. The housing 402 as a wall or sidewall 420 that has an inner surface 422 and an outer surface 424 opposite to the inner surface 422. The strain relief mechanism 100 is mounted to the wall 420. In FIG. 14, the strain relief mechanism 100 includes a mounting plate 110 located on the inside of wall 420 and a resilient member 300 located on the outside of wall 420. The mounting plate 110 is positioned adjacent to the inner surface 422 of the wall 420. The mounting plate 110 has an opening 130 formed centrally therein. As shown, a cable 450 is coupled to one or more internal components 406, and extends through opening 130 and then externally through the resilient member 300.

Turning to FIG. 15, a support 200 is located on the outside of wall 420. The support 200 has a base 210 that is positioned adjacent to the outer surface 424 of the wall 420. The support 200 includes an extension 230 through which the resilient member 300 and the cable 450 extend.

Figure 16:
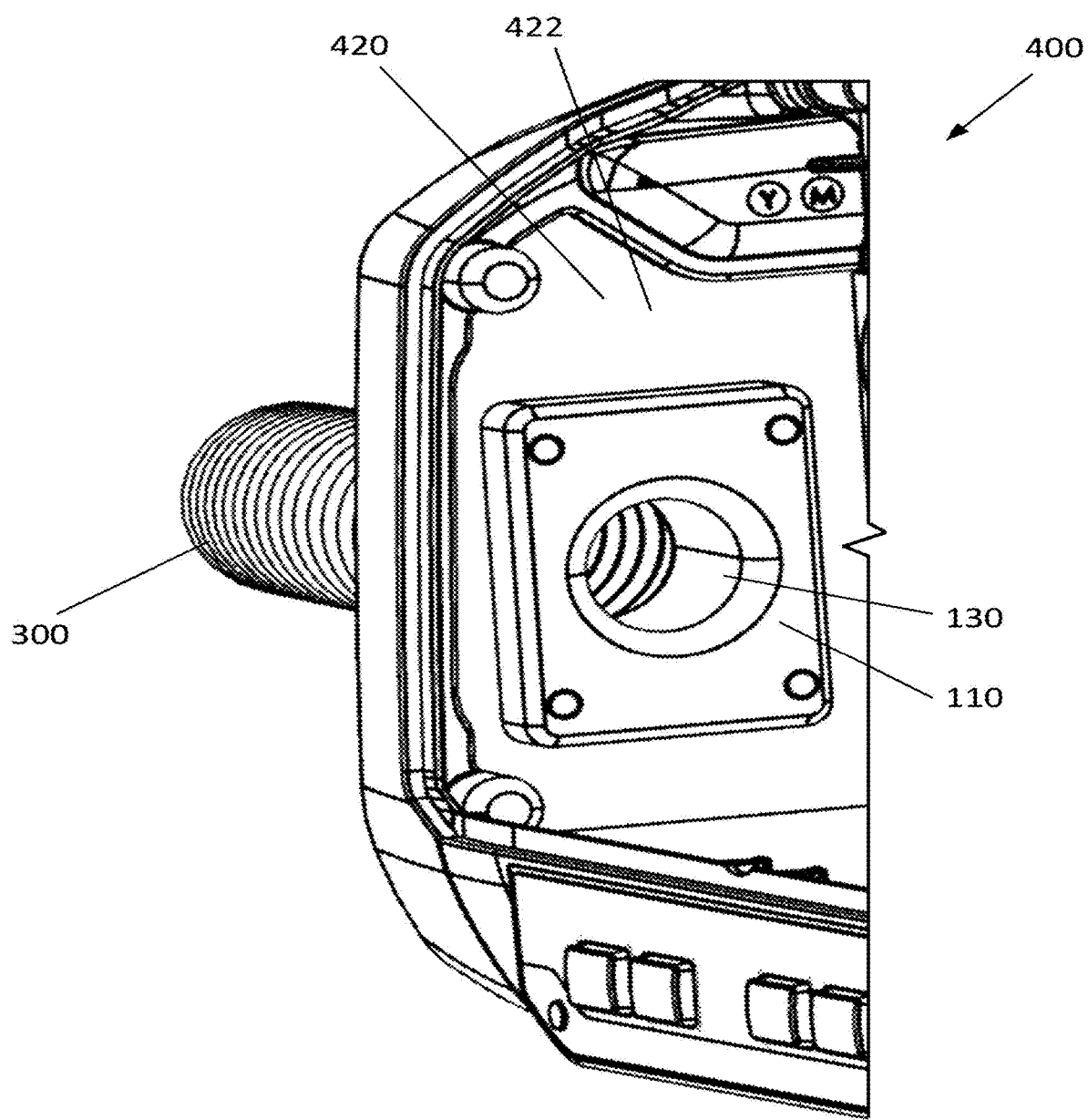
FIGS. 16-19 are various close-up perspective views of portions of the welding equipment illustrated in FIG. 14.
Figure 17:
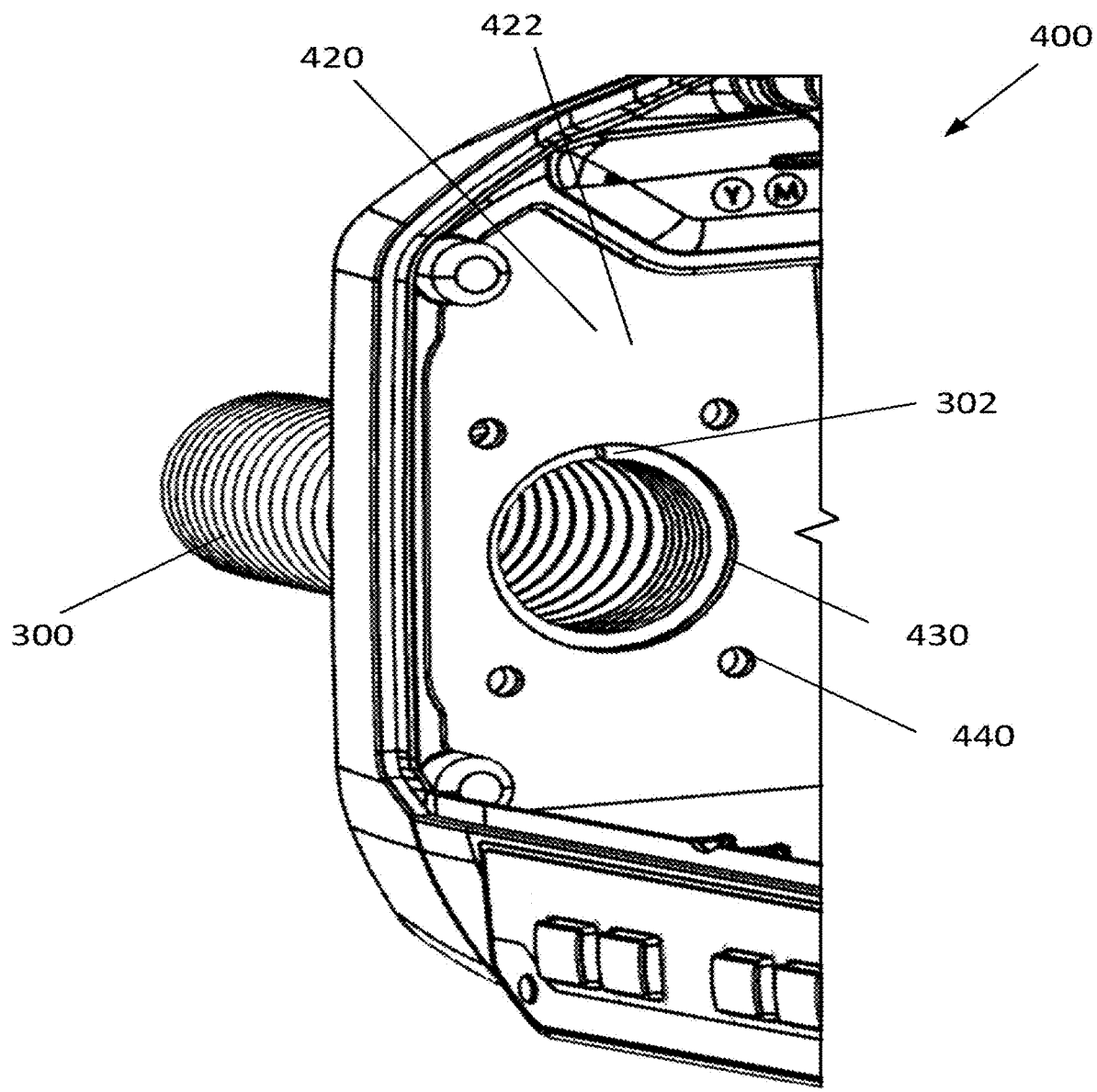

Referring to FIG. 16, an inner perspective view of a portion of the housing 402 is illustrated. The cable 450 has been removed from the welding equipment 400 for ease of illustration. The opening 130 formed in the mounting plate 110 is shown. Turning to FIG. 17, the mounting plate 110 is not illustrated. Once mounting plate 110 is removed, the opening 430 that is formed in the wall 420 through which the strain relief mechanism 100 and the cable 450 extend can be seen. Surrounding the opening 430 are several mounting holes 440 that receive fasteners 270, as described above. The inner or proximal end 302 of the resilient member 300, which abuts stop 158 is shown in its innermost position.

Figure 18:
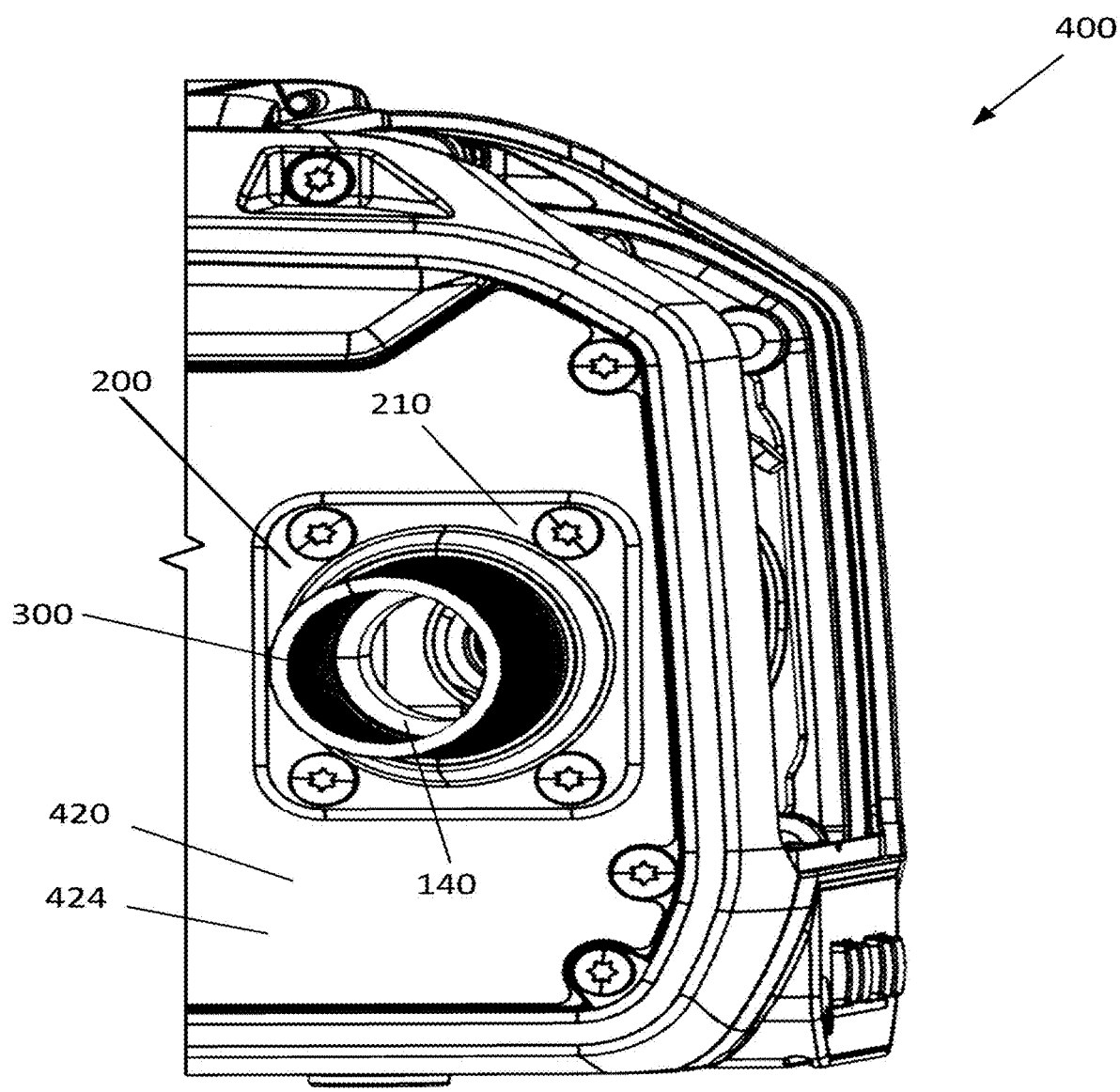

Turning to FIG. 18, an outer perspective view of a portion of the housing 402 is illustrated. The resilient member 300 as well as the support 200 with its base 210 are illustrated. The cable 450 has been removed for ease of illustration. Viewable inside of the resilient member 300 is the extension 140 of the mounting plate 110.

Figure 19:
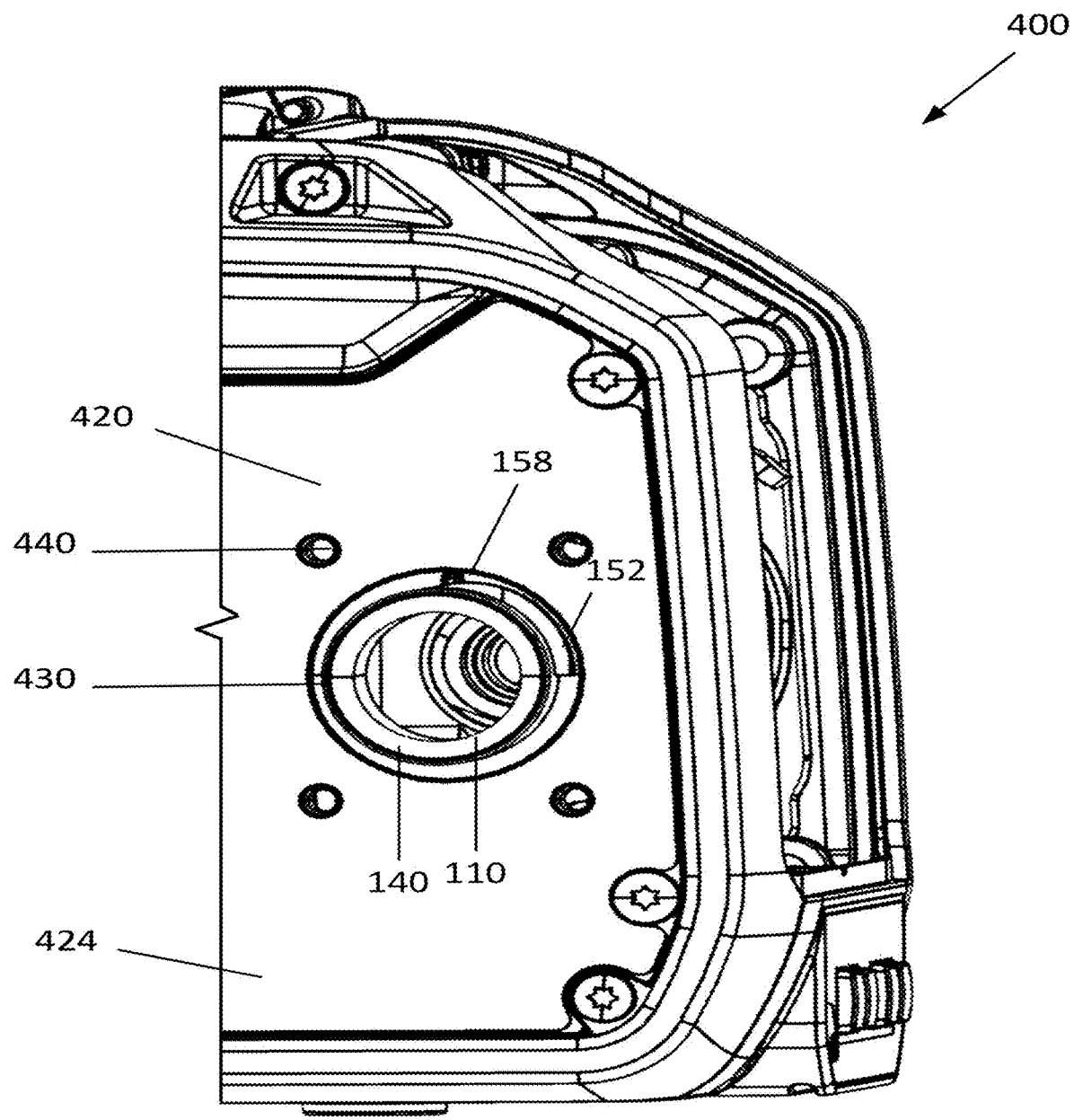

Referring to FIG. 19, the support 200 is removed and the mounting plate 110 included. In this outside perspective view, the opening 430 that is formed in the wall 420 through which the strain relief mechanism 100 and the cable 450 extend can be seen. The mounting holes 440 that receive fasteners 270, as described above, are shown around the opening 430. The mounting plate 110 with its extension 140 is shown, with the wedge-shaped projection 152 and the stop 158 located thereon.

Aspects of the disclosure are disclosed in the description herein. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Irrespective of whether it is explicitly described, one of ordinary skill in the art would readily appreciate that each of the particular features, structures, or characteristics of the given embodiments may be utilized in connection or combination with those of any other embodiment discussed herein. The term "exemplary" is used herein to describe an example or illustration. Any embodiment described herein as exemplary is not to be construed as a preferred or advantageous embodiment, but rather as one example or illustration of a possible embodiment of the invention.

For the purposes of the present disclosure, the phrase "A and/or B" means (A), (B), or (A and B), and, the phrase "A, B, and/or C" means (A), (B), (C), (A and B), (A and C), (B and C), or (A, B and C). Also, the terms "comprising," "including," "having," and the like, as used with respect to embodiments of the present disclosure, are synonymous. It is also to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration.

Finally, when used herein, the term "comprises" and its derivations (such as "comprising," etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about," "around," "generally," and "substantially."

What is claimed is:

1. A strain relief mechanism for a device, the device including a housing with a wall having an opening therethrough, the device including an elongate member extending through the opening, the strain relief mechanism comprising:
   a mounting plate having a backing plate and a first extension coupled to the mounting plate;
   a strain relief support having a base and a second extension coupled to the base; and
   a resilient member removably mounted between the first extension of the mounting plate and the second extension of the strain relief support, wherein the mounting plate and the strain relief support are coupled to each other, and the resilient member can be removed while the mounting plate and the strain relief support remain coupled.

2. The strain relief mechanism of claim 1, wherein the wall has an inner surface and an outer surface, the mounting plate is positioned proximate to the inner surface, the strain relief support is positioned proximate to the outer surface, and the mounting plate and the strain relief support are coupled to the wall of the housing.

3. The strain relief mechanism of claim 1, wherein each of the mounting plate and the strain relief support defines a hole, and the strain relief mechanism further comprises:
   at least one fastener, wherein the at least one fastener extends through the hole of the mounting plate and the hole of the strain relief support.

4. The strain relief mechanism of claim 3, wherein the wall of the housing is located between the mounting plate and the strain relief support, and the at least one fastener extends through a hole formed in the wall.

5. The strain relief mechanism of claim 1, wherein the first extension extends inside of the second extension, and the first extension and the second extension define a channel into which the resilient member is inserted.

6. The strain relief mechanism of claim 1, wherein the first extension has a first outer surface and a first inner surface, the second extension has a second outer surface and a second inner surface, and a channel is defined between the first extension and the second extension by the first outer surface and the second inner surface.

7. The strain relief mechanism of claim 6, wherein the resilient member is inserted into the channel between the first extension and the second extension.

8. The strain relief mechanism of claim 7, wherein the first extension has a cylindrical configuration, each of the second inner surface and the second outer surface is conical, and the resilient member is a substantially cylindrical spring.

9. The strain relief mechanism of claim 6, wherein the first outer surface of the first extension has a wedge-shaped projection formed thereon, the wedge-shaped projection having a first end and a second end opposite the first end, the first end having a first width, the second end having a second width, and the second width being greater than the first width.

10. The strain relief mechanism of claim 9, wherein the resilient member is rotated about the first extension to engage the wedge-shaped projection, and the resilient member engages the first end of the wedge-shaped projection as it is rotated.

11. The strain relief mechanism of claim 10, wherein the base includes a stop formed thereon, and the resilient member engages the stop after it has rotated past the wedge-shaped projection.

12. The strain relief mechanism of claim 1, wherein the resilient member has a first portion with coils at a first spacing and a second portion with coils at a second spacing, the second spacing being smaller than the first spacing, the first portion is located between the mounting plate and the strain relief support, and the second portion is spaced apart from the mounting plate and the strain relief support.

13. A strain relief mechanism for a welding device, the welding device including a housing with a wall having an opening therethrough, the welding device including one of a lead or a cable extending through the opening, the strain relief mechanism comprising:
a mounting plate having a first base and a first extension coupled to the first base;
a support having a second base and a second extension coupled to the second base; and
a resilient member removably coupled to and located between the first extension and the second extension, wherein the mounting plate and the support are coupled to each other and located on opposite sides of the wall, the one of a lead or a cable is insertable through the mounting plate, the support, and the resilient member, and the resilient member is removable while the mounting plate and the support are coupled.

14. The strain relief mechanism of claim 13, wherein the wall has an inner surface and an outer surface, the mounting plate is positioned proximate to the inner surface, the support is positioned proximate to the outer surface, and the resilient member is located outside of the housing.

15. The strain relief mechanism of claim 13, wherein the first extension has a first outer surface and a first inner surface, the second extension has a second outer surface and a second inner surface, a channel is defined between the first outer surface of the first extension and the second inner surface of the second extension, and the resilient member is insertable into the channel.

16. The strain relief mechanism of claim 15, wherein each of the first outer surface and the first inner surface is cylindrical, and each of the second inner surface and the second outer surface is conical.

17. The strain relief mechanism of claim 15, wherein the first outer surface has a wedge-shaped projection formed thereon, the wedge-shaped projection having a varying width, the resilient member is rotated about the first extension to engage the wedge-shaped projection, and the resilient member engages the wedge-shaped projection as it is inserted into the channel and rotated.

18. A device comprising:
a housing with a wall having an opening therethrough;
an elongate member extending through the opening; and
a strain relief mechanism including:
a mounting plate having a first base and a first extension coupled to the first base;
a support member having a second base and a second extension coupled to the second base; and
a resilient member removably mounted between the first extension of the mounting plate and the second extension of the support member, wherein the first extension of the mounting plate extends through the opening in the wall, the elongate member extends through the first extension, the second extension, and the resilient member, and the resilient member can be removed while the mounting plate and the support member remain coupled to the wall.

19. The device of claim 18, wherein the wall has an inner surface and an outer surface, the mounting plate is positioned proximate to the inner surface, the support member is positioned proximate to the outer surface, and the mounting plate is coupled to the support member with the wall of the housing located therebetween.

20. The device of claim 19, wherein the first extension has an outer surface with a wedge-shaped projection formed thereon, the wedge-shaped projection having a varying width from a first end and to an opposite second end, and the resilient member is rotated about the first extension to engage the wedge-shaped projection, and the resilient member engages the first end of the wedge-shaped projection as it is rotated.

* * * * *